US012798438B2

(12) United States Patent
Nee et al.

(10) Patent No.: US 12,798,438 B2
(45) Date of Patent: Nov. 17, 2026

(54) STAND-ALONE THERMAL MANAGEMENT SYSTEM FOR A BATTERY SYSTEM OF A MACHINE

(71) Applicant: Caterpillar Inc., Peoria, IL (US)

(72) Inventors: Brett Michael Nee, Germantown Hills, IL (US); Andrew Olson, Vail, AZ (US); Dustin Dale Denning, Chillicothe, IL (US); Scott Alan Tipton, Washington, IL (US); Christopher L. Wynkoop, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 720 days.

(21) Appl. No.: 18/316,037

(22) Filed: May 11, 2023

(65) Prior Publication Data

US 2024/0380017 A1 Nov. 14, 2024

(51) Int. Cl.
*B60L 58/24* (2019.01)
*H01M 10/625* (2014.01)
(Continued)

(52) U.S. Cl.
CPC ........... *B60L 58/24* (2019.02); *H01M 10/625* (2015.04); *H01M 10/63* (2015.04); *H01M 10/66* (2015.04); *H01M 2220/20* (2013.01)

(58) Field of Classification Search
CPC .... H01M 10/625; H01M 10/63; H01M 10/66; H01M 2220/20; B60L 58/24; B60L 1/02;
(Continued)

(56) References Cited

U.S. PATENT DOCUMENTS 8,620,506 B2 12/2013 Kummer et al.
9,793,585 B2 10/2017 Obasih et al.
(Continued)

FOREIGN PATENT DOCUMENTS

CN 107946689 A * 4/2018 ........ H01M 10/6554
CN 108448198 B * 5/2020 .......... H01M 10/633
(Continued)

OTHER PUBLICATIONS

Written Opinion and International Search Report for Int'l. Patent Appln. No. PCT/US2024/023975, mailed Jul. 23, 2024 (28 pgs).

*Primary Examiner* — Mong-Shune Chung
(74) *Attorney, Agent, or Firm* — Harrity & Harrity LLP

(57) ABSTRACT

A thermal management system for a battery system of a machine includes one or more thermal management components, a power connector, and a controller. The thermal management system is separate from the machine. The one or more thermal management components are configured to facilitate thermal management of the battery system of the machine. The power connector is configured to provide power to the thermal management system from a power source external to the machine. The controller is configured to communicate with another controller of the machine to allow the controller to control the one or more thermal management components, wherein the other controller is configured to control the thermal management of the battery system of the machine.

20 Claims, 6 Drawing Sheets

(51) Int. Cl.
*H01M 10/63* (2014.01)
*H01M 10/66* (2014.01)

(58) Field of Classification Search
CPC ........... B60L 2200/40; B60L 2240/545; B60L 58/26; B60L 58/27
See application file for complete search history.

(56) References Cited

U.S. PATENT DOCUMENTS

| | | | | |
|---|---|---|---|---|
| 10,017,072 | B2 | 7/2018 | Galamb | |
| 10,369,898 | B2 | 8/2019 | Newman et al. | |
| 11,515,586 | B2 | 11/2022 | Guerra et al. | |
| 2014/0012447 | A1 | 1/2014 | Gao et al. | |
| 2015/0266387 | A1* | 9/2015 | Garfinkel | H01M 10/6551 180/65.21 |
| 2016/0211558 | A1* | 7/2016 | Ma | H01M 10/654 |
| 2016/0233564 | A1* | 8/2016 | Rinker | B60L 58/27 |
| 2017/0088007 | A1* | 3/2017 | Melendez | B60L 53/302 |
| 2017/0088008 | A1* | 3/2017 | Melendez | B60L 58/21 |
| 2017/0096073 | A1* | 4/2017 | Mardall | B60L 58/24 |
| 2018/0034122 | A1 | 2/2018 | Newman | |
| 2019/0341661 | A1* | 11/2019 | Guerra | B60L 53/16 |

FOREIGN PATENT DOCUMENTS

| | | | |
|---|---|---|---|
| CN | 111186322 | A | 5/2020 |
| DE | 102017214700 | A1 | 2/2019 |
| DE | 102019107543 | A1 | 5/2019 |
| DE | 102019203349 | A1 | 9/2020 |
| DE | 102020117581 | A1 | 1/2022 |
| DE | 102021200150 | A1 | 7/2022 |

* cited by examiner

STAND-ALONE THERMAL MANAGEMENT SYSTEM FOR A BATTERY SYSTEM OF A MACHINE

TECHNICAL FIELD

The present disclosure relates generally to a thermal management system and, for example, to a stand-alone thermal management system for a battery system of a machine.

BACKGROUND

Electric machines, such as vehicles or other mobile machines, that are at least partially powered by on-board batteries can be environmentally-friendly alternatives to machines powered by fossil fuels. Such a machine typically includes an internal thermal management system that is intended to keep on-board batteries within an optimal temperature range while the machine operates. However, a typical internal thermal management system is not designed to operate in extreme temperatures, such as those experienced in extremely hot or cold climates, and therefore is not able to maintain the optimal temperature range of the on-board batteries. This is a particular issue when the on-board batteries are not operating (e.g., not providing a current), such as during a period of non-operation of the machine and/or charging of the on-board batteries. When a battery is subject to too cold temperatures, a capacity of the battery can be reduced, and when subject to too high temperatures, the battery can degrade and is prone to failure. This impacts a performance and/or an operable life of the on-board batteries, and of the machine that includes the on-board batteries.

U.S. Pat. No. 10,369,898 (the '898 patent) discloses a vehicle that has both an internal and external thermal management unit to control the temperature of an on board energy storage unit, particularly during charging. Per the '898 patent, a thermal management controls the operations, settings, and configuration of both the internal and external thermal management units.

While the '898 patent discloses some benefits, the external thermal management system of the present disclosure is a standalone system (e.g., a separate system that includes a controller to control its own operation) that facilitates thermal management of a battery system of a machine. The external thermal management system of the present disclosure therefore solves one or more of the problems set forth above and/or other problems in the art.

SUMMARY

A thermal management system for a battery system of a machine may include one or more thermal management components; a power connector; and a controller, wherein: the thermal management system is separate from the machine, the one or more thermal management components are configured to facilitate thermal management of the battery system of the machine, the power connector is configured to provide power to the thermal management system from a power source external to the machine, and the controller is configured to communicate with another controller of the machine to allow the controller to control the one or more thermal management components, wherein the other controller is configured to control the thermal management of the battery system of the machine.

A thermal management system for a battery system of a machine may include one or more thermal management components; and a controller, wherein: the thermal management system is separate from the machine, the one or more thermal management components are configured to facilitate thermal management of the battery system of the machine, and the controller is configured to communicate with another controller of the machine to allow the controller to control the one or more thermal management components.

A method may include receiving, by a controller of a machine and from another controller of a thermal management system that is separate from the machine, connection information indicating that the thermal management system is able to facilitate thermal management of a battery system of the machine; sending, by the controller, to the other controller, and based on receiving the connection information, enablement information to allow one or more thermal management components of the thermal management system to be enabled by the other controller; and sending, by the controller, to the other controller, and based on sending the enablement information, control information to allow the one or more thermal management components to be controlled by the other controller.

DETAILED DESCRIPTION

This disclosure relates to a stand-alone thermal management system for a battery system of a machine, which is applicable to any machine that is at least partially powered by a battery. The machine may be any type of machine configured to perform operations associated with an industry such as mining, construction, farming, transportation, or any other industry.

Figure 1:
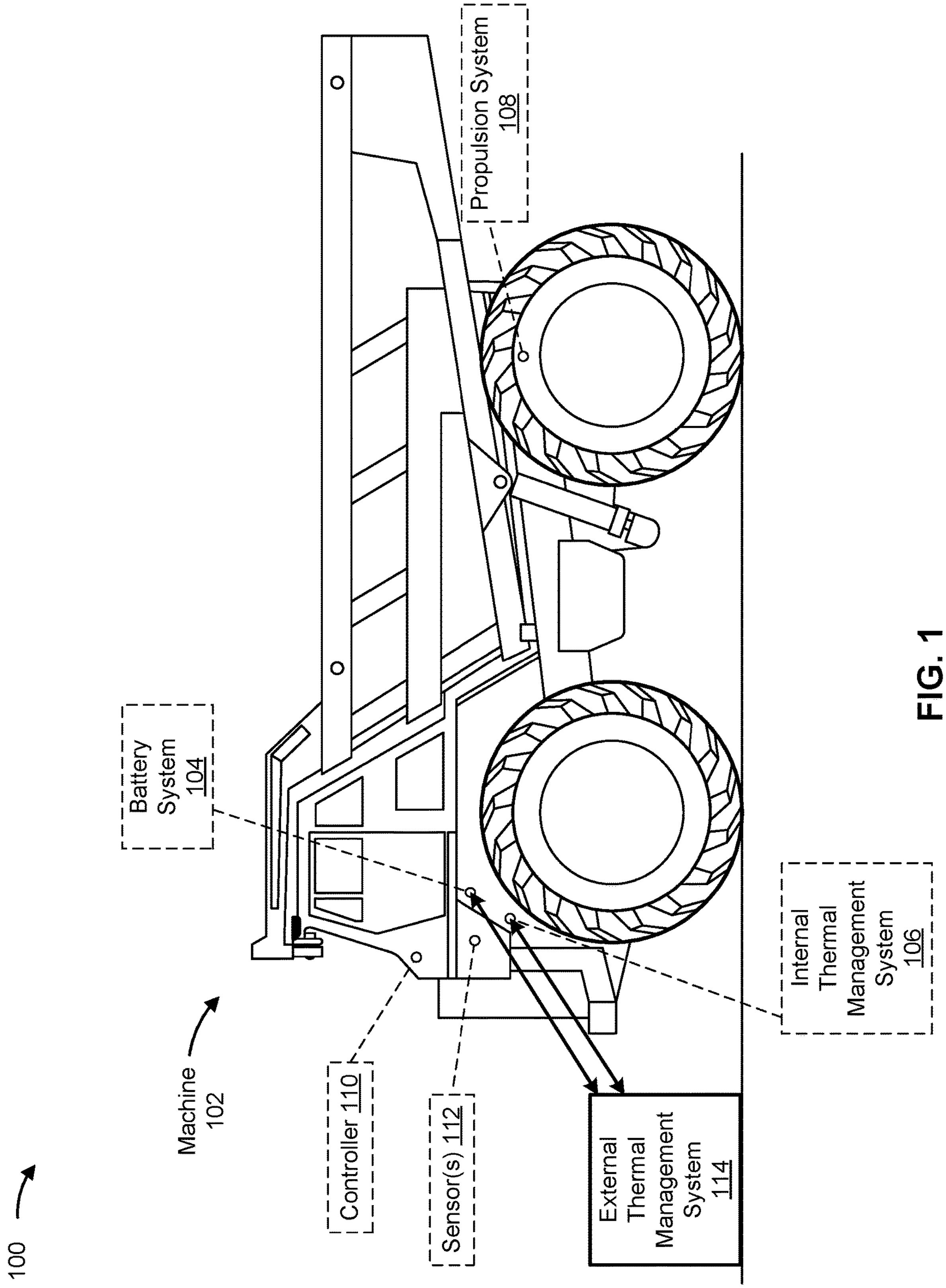
FIG. 1 is a diagram of an example implementation described herein.

FIG. 1 is a diagram of an example implementation 100 described herein. As shown in FIG. 1, the implementation 100 may include a machine 102. The machine 102 may be a mobile machine or vehicle, and may include a dump truck, a wheel loader, a hydraulic excavator, or another type of machine. Further, the machine 102 may be a manned machine or an unmanned machine. The machine 102 may be fully-autonomous, semi-autonomous, or remotely operated. As further shown in FIG. 1, the machine 102 may include a battery system 104, an internal thermal management system 106, a propulsion system 108, a controller 110, and/or one or more sensors 112.

The machine 102 may be configured to be at least partially powered by the battery system 104. For example, the machine 102 may be a battery electric machine (BEM), a battery electric vehicle (BEV), a hybrid vehicle, a fuel cell and battery hybrid vehicle, or another machine that is at least partially powered by the battery system 104. The machine 102 may include one or more electric engines, one or more electric motors, one or more electrical conversion systems, and/or other electrical components that are configured to convert and/or use energy, such as energy stored in the battery system 104, to cause overall movement of the machine 102 across a work site and/or to cause movement of individual components or systems of the machine 102.

The battery system 104 may include one or more batteries, such as one or more lithium-ion (Li-ion) batteries, lithium-ion polymer batteries, nickel-metal hydride (NiMH) batteries, lead-acid batteries, nickel cadmium (Ni—Cd) batteries, zinc-air batteries, sodium-nickel chloride batteries, or other types of batteries. In some implementations, multiple battery cells may be grouped together, in series or in parallel, within a battery module. Multiple battery modules may be grouped together, such as in series, within a battery string. One or more battery strings may be provided within a battery pack, such as a group of battery strings linked together in parallel. Accordingly, the battery system 104 may include one or more battery packs, one or more battery strings, one or more battery modules, and/or one or more battery cells.

The battery system 104 may include one or more activation components (not shown in FIG. 1). For example, the battery system 104 may include one or more switches, such as one or more key switches, that allow (or disallow) activation of the battery system 104. For example, the battery system 104 may be active, such as to provide power to one or more other components or systems of the machine 102, when the one or more activation components are enabled. In contrast, the battery system 104 may be inactive, such as to not provide power to one or more other components or systems of the machine 102, when the one or more activation components are disabled.

The battery system 104 may be associated with one or more electrical components (not shown in FIG. 1) of the machine 102, such as one or more electric power buses and/or one or more electric power converters, which may facilitate providing (or not providing) power to one or more other components or systems of the machine 102. For example, the one or more electrical components may facilitate providing power to one or more other components or systems of the machine 102 when the one or more electrical components are enabled. In contrast, the one or more electrical components may not facilitate providing power to one or more other components or systems of the machine 102 when the one or more electrical components are disabled.

The internal thermal management system 106 may be configured to facilitate thermal management of the battery system 104 of the machine 102. For example, the internal thermal management system 106 may be configured to facilitate at least one of active thermal management of the battery system 104 or passive thermal management of the battery system 104. The internal thermal management system 106 is further described herein in relation to FIG. 2.

The propulsion system 108 may include one or more propulsion components of the machine 102. The one or more propulsion components may include, for example, a drive train (e.g., that includes a transmission), wheels, axles, or other components that are configured to facilitate propulsion of the machine 102 (e.g., movement of the machine 102 at a work site). For example, the one or more propulsion components may facilitate propulsion of the machine when the one or more propulsion components are enabled. In contrast, the one or more propulsion components may not facilitate propulsion (or may prevent propulsion) of the machine when the one or more propulsion components are disabled.

The controller 110 may be an electronic control module (ECM) or other computing device. The controller 110 may be in communication (e.g., by a wired connection or a wireless connection) with the battery system 104, the internal thermal management system 106, the propulsion system 108, and/or the one or more sensors 112. The controller 110 may also be in communication with other components and/or systems of the machine 102.

The one or more sensors 112 may be installed at one or more points on the machine 102 and may be configured to generate sensor data. For example, the one or more of sensors 112 may include one or more sensors configured to detect one or more temperatures associated with the machine 102 (e.g., an internal environment of the machine 102 associated with the battery system 104, and/or an external environment of the machine 102, among other examples), the battery system 104 (e.g., one or more battery packs, one or more battery strings, one or more battery modules, and/or one or more battery cells of the battery system 104, among other examples), the internal thermal management system 106 (e.g., one or more thermal management components of the internal thermal management system 106), and/or another component of the machine 102.

As further shown in FIG. 1, the implementation 100 may further include an external thermal management system 114. The external thermal management system 114 may be a stand-alone system (e.g., may be separate from the machine 102), and may be configured to facilitate thermal management of the battery system 104 of the machine 102. For example, the external thermal management system 114 may be configured to connect (e.g., as indicated by the arrows in FIG. 1) to the battery system 104 and/or the internal thermal management system 106, and may be configured to facilitate at least one of active thermal management of the battery system 104 or passive thermal management of the battery system 104. The external thermal management system 114 is further described herein in relation to FIG. 2. In some implementations, the controller 110 may be in communication (e.g., by a wired connection or a wireless connection) with the external thermal management system 114, as further described herein.

As indicated above, FIG. 1 is provided as an example. Other examples may differ from what is described in connection with FIG. 1.

Figure 2:
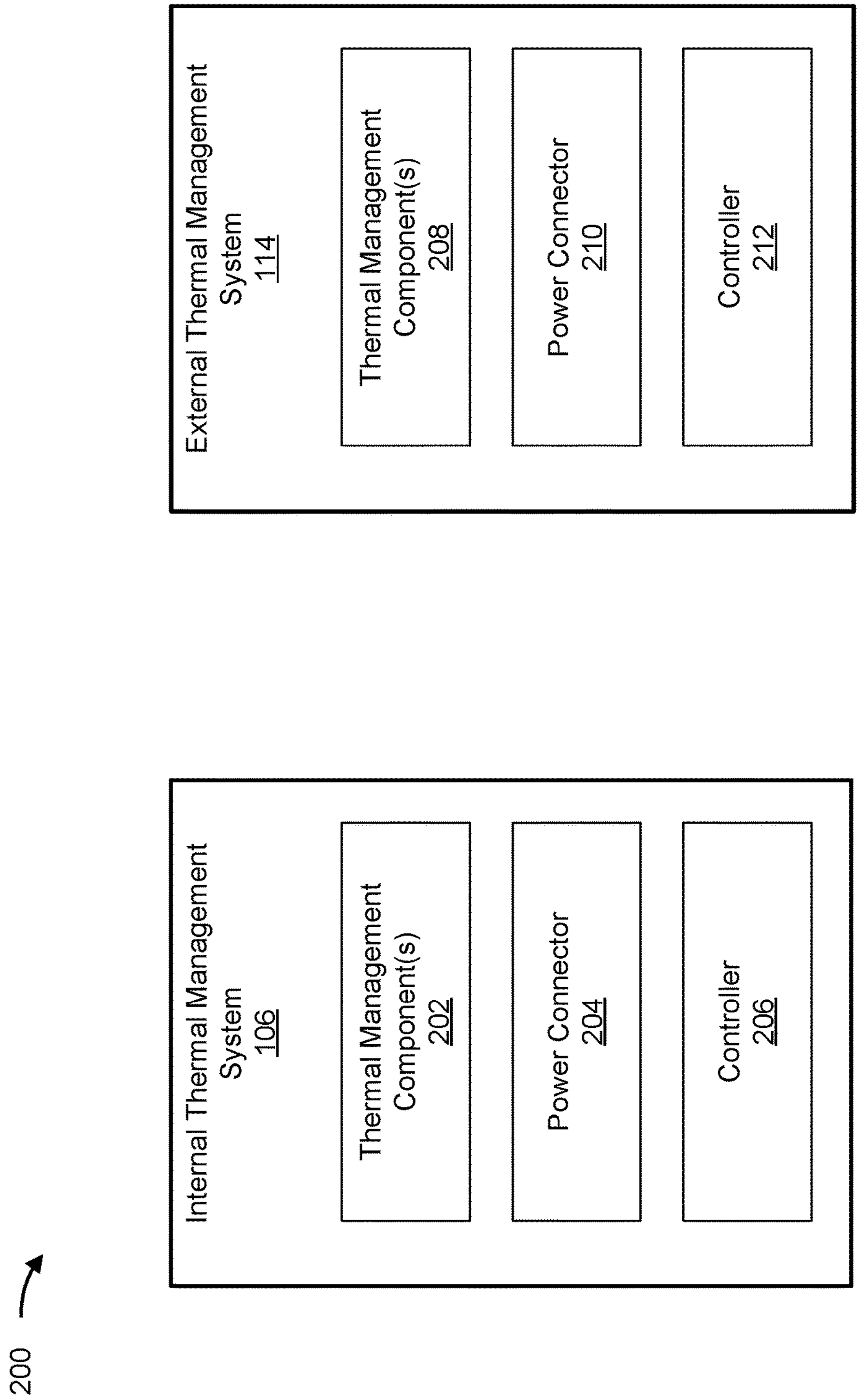
FIG. 2 is a diagram of an example implementation described herein.

FIG. 2 is a diagram of an example implementation 200 described herein. FIG. 2 shows example components of the internal thermal management system 106 and the external thermal management system 114.

As shown in FIG. 2, the internal thermal management system 106 may include one or more thermal management components 202. The one or more thermal management components 202 may be configured to facilitate thermal management of the battery system 104. The one or more thermal management components 202 may include, for example, one or more active thermal management components and/or one or more passive thermal management components. For example, the one or more thermal management components 202 may include one or more components (e.g., one or more tubes, one or more bladders, one or more tanks, one or more plates, one or more pumps, one or more heat pipes, one or more evaporators, one or more condensers, one or more heat exchangers, one or more radiators one or more fans, one or more heaters, one or more coolers, and/or one or more other components) for holding, circulating, heating, and/or cooling, a thermal transfer fluid (e.g., a liquid, such as a "coolant," that includes at least one of water or ethylene glycol), a phase change material (PCM) (e.g., that includes at least one of a paraffin, a fatty acid, or a hydrated salt), or a gas (e.g., that includes air). Accordingly, the internal thermal management system 106 may be connected (e.g., thermally connected, such as to allow a flow of heat) to the battery system 104 via the one or more thermal management components 202 to allow the internal thermal management system 106 to facilitate thermal management of the battery system 104.

As further shown in FIG. 2, the internal thermal management system 106 may include a power connector 204 and a controller 206. The power connector 204 may be configured to provide power (e.g., electrical power) to the internal thermal management system 106. The power connector 204 may be a wired electrical energy transfer interface that can be physically connected to the battery system 104 and/or another power source included in the machine 102 that generates and/or provides electric power. Accordingly, when the power connector 204 is connected to the battery system 104 and/or the other power source included in the machine 102, current can flow from the battery system 104 and/or the other power source, to the internal thermal management system 106, which allows the internal thermal management system 106 to operate and thereby facilitate thermal management of the battery system 104.

The controller 206 may be an ECM or other computing device, and may be configured to control the one or more thermal management components 202. The controller 206 may be in communication (e.g., by a wired connection or a wireless connection) with the one or more thermal management components 202, and/or the controller 110 of the machine 102, as further described herein.

As further shown in FIG. 2, the external thermal management system 114 may include one or more thermal management components 208. The one or more thermal management components 208 may be configured to facilitate thermal management of the battery system 104. The one or more thermal management components 208 may include, for example, one or more active thermal management components and/or one or more passive thermal management components. For example, the one or more thermal management components 208 may include one or more components (e.g., one or more tubes, one or more bladders, one or more tanks, one or more plates, one or more pumps, one or more heat pipes, one or more evaporators, one or more condensers, one or more heat exchangers, one or more radiators one or more fans, one or more heaters, one or more coolers, and/or one or more other components) for holding, circulating, heating, and/or cooling, a thermal transfer fluid (e.g., a liquid, such as a coolant, that includes at least one of water or ethylene glycol), a PCM (e.g., that includes at least one of a paraffin, a fatty acid, or a hydrated salt), or a gas (e.g., that includes air).

The external thermal management system 114 may be configured to connect (e.g., thermally connect) to the battery system 104 and/or the internal thermal management system 106. For example, at least one thermal management component 208, of the one or more thermal management components, may be configured to thermally connect to at least one of the battery system 104 or the internal thermal management system 106, such as further described herein in relation to FIG. 3. Accordingly, the external thermal management system 114 may be configured to connect to the battery system 104 and/or the internal thermal management system 106 via the one or more thermal management components 202 to allow the internal thermal management system 106 to facilitate thermal management of the battery system 104.

As further shown in FIG. 2, the external thermal management system 114 may include a power connector 210 and a controller 212. The power connector 210 may be configured to provide power (e.g., electrical power) to the external thermal management system 114. The power connector 210 may be a wired electrical energy transfer interface that can be physically connected to a power source external to the machine 102 (e.g., that does not include the battery system 104 or another power source included in the machine 102). For example, the power connector 210 may be configured to couple to an external power source (e.g., an alternating current (AC) power source or a direct current (DC) power source), such as a power source that is not used to charge the battery system 104 (e.g., a power source that is not associated with a charging device for the battery system 104). Accordingly, when the power connector 210 is connected to the external power source, current can flow from the external power source to the external thermal management system 114, which allows the external thermal management system 114 to operate and thereby facilitate thermal management of the battery system 104.

The controller 212 may be an ECM or other computing device, and may be configured to control the one or more thermal management components 208. The controller 212 may be in communication (e.g., by a wired connection or a wireless connection) with the one or more thermal management components 208 and/or the controller 110, as further described herein.

As indicated above, FIG. 2 is provided as an example. Other examples may differ from what is described in connection with FIG. 2.

Figure 3:
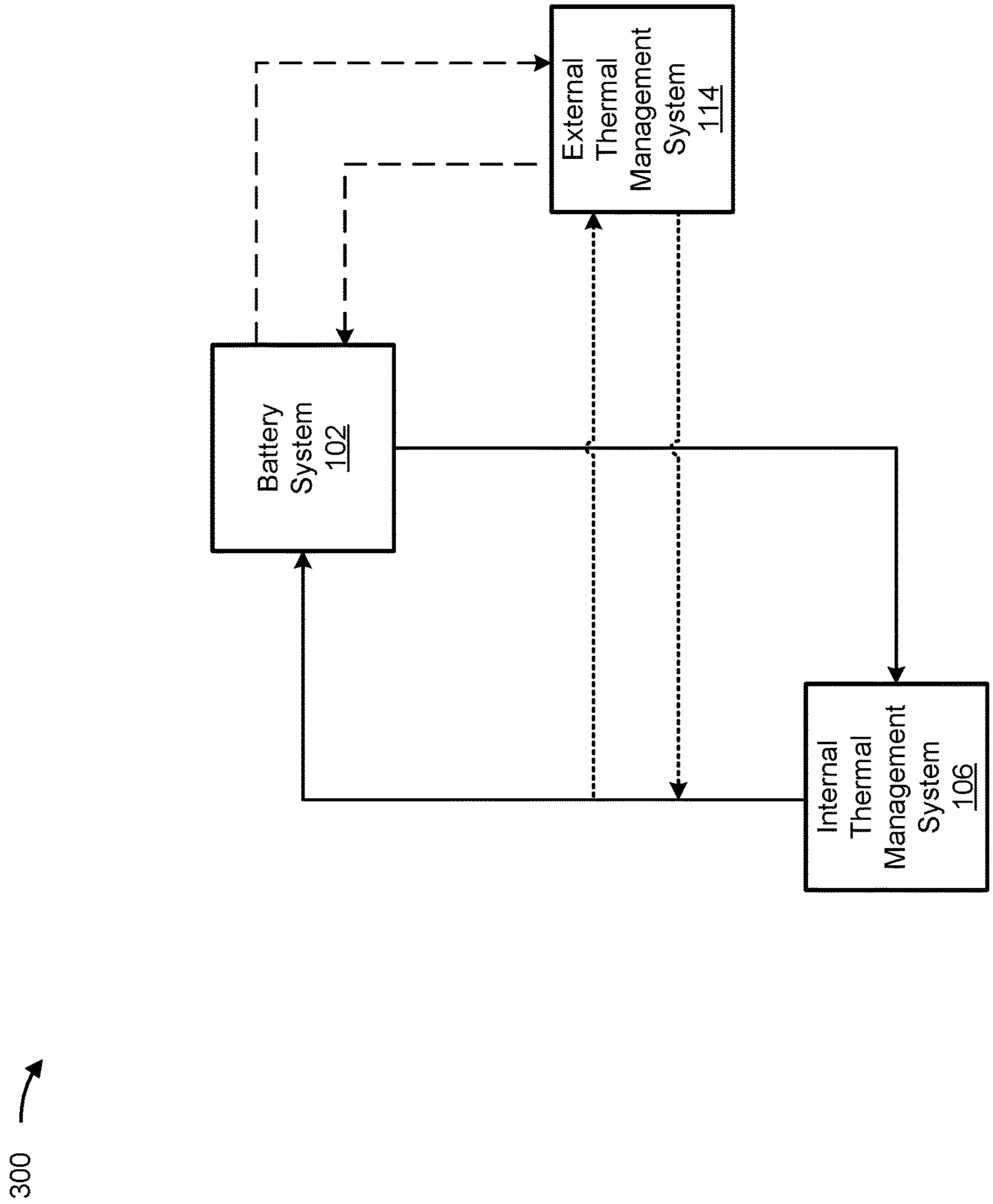
FIG. 3 is a diagram of an example implementation described herein.

FIG. 3 is a diagram of an example implementation 300 showing how the battery system 104, the internal thermal management system 106, and the external thermal management system 114 may be connected (e.g., thermally connected). Accordingly, as further described herein in relation to example implementation 300, the external thermal management system 114 (e.g., the one or more thermal management components 208 of the external thermal management system 114) may be configured to facilitate thermal management of the battery system 104 in association with, or, alternatively, independently of, the internal thermal management system 106.

As shown in FIG. 3, and by solid arrows, the internal thermal management system 106 may be connected (e.g., thermally connected) to the battery system 104. For example, the one or more thermal management components 202 may be connected to the battery system 104 to allow a thermal transfer fluid to circulate between the internal thermal management system 106 and the battery system 104, and thereby facilitate thermal management of the battery system 104.

Additionally, as shown in FIG. 3, and by quarter-dashed arrows, the external thermal management system 114 may be configured to connect to the internal thermal management system 106. For example, at least one thermal management component 208, of the one or more thermal management components 208, may be configured to connect to the internal thermal management system 106 (or to at least one thermal management component 202 of the internal thermal management system 106). When connected, this may allow a thermal transfer fluid (e.g., at least some of the same thermal transfer fluid that is circulated between the internal thermal management system 106 and the battery system

104, or a different thermal transfer fluid) to circulate between the external thermal management system 114 and the internal thermal management system 106. Accordingly, the external thermal management system 114 may be configured to facilitate thermal management of the internal thermal management system 106 (or at least one thermal management component 202 of the internal thermal management system 106), and thereby facilitate (e.g., indirectly facilitate) thermal management of the battery system 104. In this way, the external thermal management system 114 (e.g., the one or more thermal management components 208 of the external thermal management system 114) may be configured to facilitate thermal management of the battery system 104 in association with the internal thermal management system 106.

Additionally, or alternatively, as shown in FIG. 3, and by full-dashed arrows, the external thermal management system 114 may be configured to connect to the battery system 104. For example, at least one thermal management component 208, of the one or more thermal management components 208, may be configured to connect to the battery system 104. When connected, this may allow a thermal transfer fluid (e.g., at least some of the same thermal transfer fluid that is circulated between the internal thermal management system 106 and the battery system 104, or a different thermal transfer fluid) to circulate between the external thermal management system 114 and the battery system 104. Accordingly, the external thermal management system 114 may be configured to facilitate (e.g., directly facilitate) thermal management of the battery system 104. In this way, the external thermal management system 114 (e.g., the one or more thermal management components 208 of the external thermal management system 114) may be configured to facilitate thermal management of the battery system 104 in association with, or, alternatively, independently of, the internal thermal management system 106 (e.g., regardless of whether the internal thermal management system 106 is, or is not, operating).

As indicated above, FIG. 3 is provided as an example. Other examples may differ from what is described in connection with FIG. 3.

Figure 4:
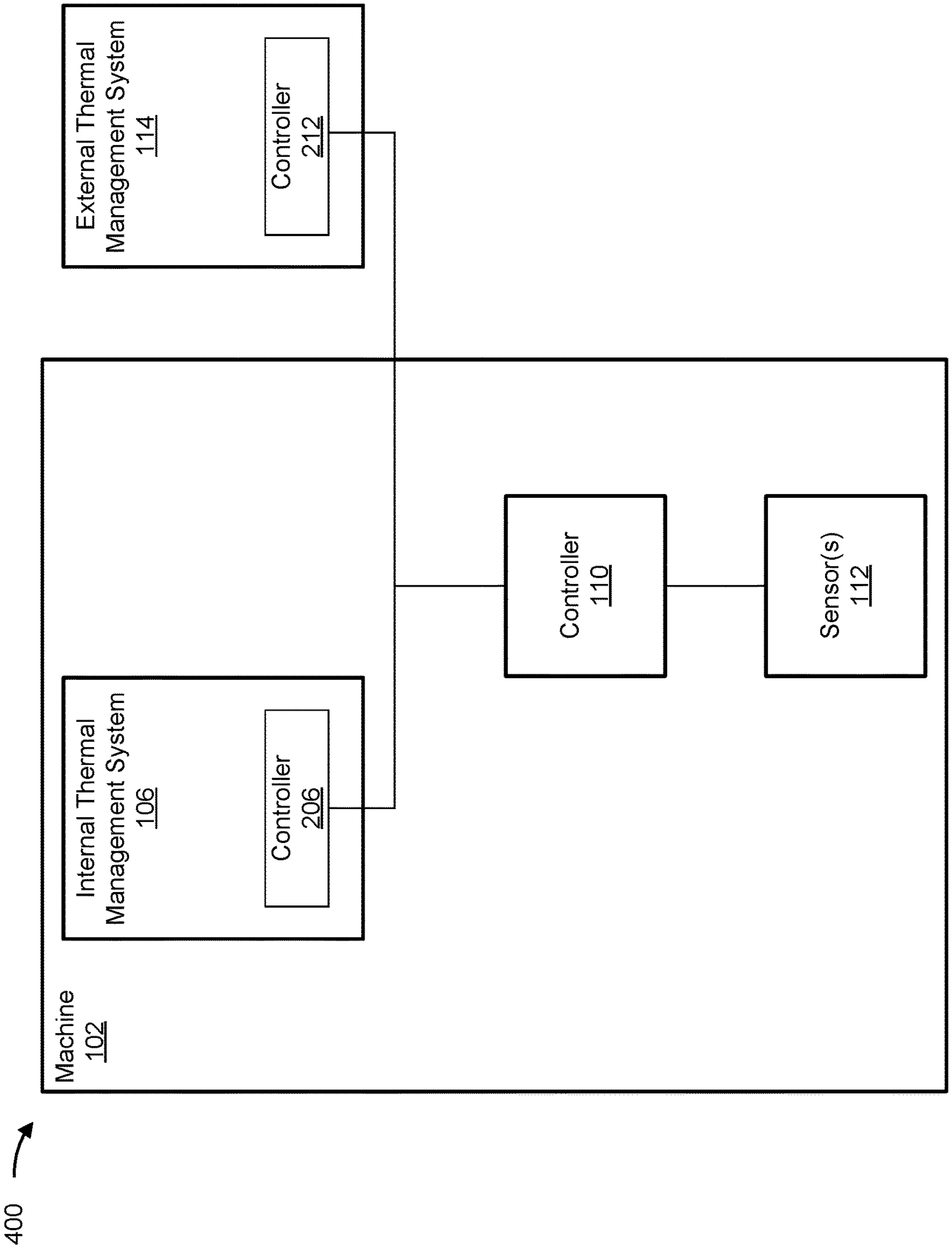
FIG. 4 is a diagram of an example implementation described herein.

FIG. 4 is a diagram of an example implementation 400 showing how the controller 110 of the machine 102, the controller 206 of the internal thermal management system 106, and the controller 212 of the external thermal management system 114 may be configured to communicate.

The controller 110 of the machine 102 may be configured to control thermal management of the battery system 104 of the machine 102. Accordingly, as shown in FIG. 4, the controller 110 of the machine 102 may be configured to communicate with the one or more sensors 112, the controller 206 of the internal thermal management system 106, and/or the controller 212 of the external thermal management system 114. The controller 110 may be configured to communicate with the one or more sensors 112 to obtain sensor data (e.g., temperature data associated with the battery system 104 and/or the internal thermal management system 106) captured by the one or more sensors 112, may be configured to communicate with the controller 206 to provide first control information (e.g., that is associated with the sensor data) to the internal thermal management system 106 (e.g., to allow the controller 206 to control the internal thermal management system 106 based on the first control information), and/or may be configured to communicate with the controller 212 to provide second control information (e.g., that is associated with the sensor data) to the external thermal management system 114 (e.g., to allow the controller 212 to control the external thermal management system 114 based on the second control information).

The controller 206 of the internal thermal management system 106 may be configured to control the internal thermal management system 106. Accordingly, as further shown in FIG. 4, the controller 206 may be configured to communicate with the controller 110 of the machine 102 and/or the controller 212 of the external thermal management system 114. For example, the controller 206 may be configured to receive the first control information from the controller 110 to allow the controller 206 to control (e.g., based on the first control information) the one or more thermal management components 202 of the internal thermal management system 106. As another example, the controller 206 may be configured to communicate, with the controller 212, status information (e.g., indicating an operation status of the internal thermal management system 106 and/or an operation status of the external thermal management system 114), such as to allow the controller 206 to further control (e.g., based on the status information) the one or more thermal management components 202 of the internal thermal management system 106.

The controller 212 of the external thermal management system 114 may be configured to control the external thermal management system 114. Accordingly, as further shown in FIG. 4, the controller 212 of the external thermal management system 114 may be configured to communicate with the controller 110 of the machine 102 and/or the controller 206 of the internal thermal management system 106. For example, the controller 212 may be configured to receive the second control information from the controller 110 to allow the controller 212 to control (e.g., based on the second control information) the one or more thermal management components 208 of the external thermal management system 114. As another example, the controller 212 may be configured to communicate, with the controller 206, the status information (e.g., indicating the operation status of the internal thermal management system 106 and/or the operation status of the external thermal management system 114), such as to allow the controller 212 to further control (e.g., based on the status information) the one or more thermal management components 202 of the internal thermal management system 106.

In some implementations, the controller 212 of the external thermal management system 114 may be configured to determine that at least one thermal management component 208, of the one or more thermal management components 208 of the external thermal management system 114, is thermally connected to at least one of the battery system 104 or the internal thermal management system 106. For example, the controller 212 may obtain data from a sensor of the external thermal management system 114 indicating the thermal connection, or may obtain an indication from a user of the external thermal management system 114 (e.g., via a user interface of the external thermal management system 114) of the thermal connection. Accordingly, the controller 212 may send (e.g., based on determining that the at least one thermal management component 208 is thermally connected) connection information to the controller 110 of the machine 102. The connection information may indicate that the external thermal management system 114 is able to facilitate thermal management of the battery system 104 of the machine 102 (e.g., because of the thermal connection).

The controller 110 may receive the connection information from the controller 212, and may thereby generate enablement information (e.g., based on the connection information). The enablement information may indicate that the controller 212 is to enable the external thermal management system 114 and/or the one or more thermal management components 208 of the external thermal management system 114, such as to facilitate thermal management of the battery system 104. The controller 110 may then send the enablement information to the controller 212 to allow the external thermal management system 114 and/or the one or more thermal management components 208 to be enabled by the controller 212.

The controller 212 may receive the enablement information from the controller 110, and may thereby cause the external thermal management system 114 and/or the one or more thermal management components 208 to be enabled. For example, the controller 212 may cause a valve, or another component, of the one or more thermal management components 208 to be adjusted to allow the one or more thermal management components 208 to be able to circulate a thermal transfer fluid, as described herein. The controller then may generate and send, to the controller 110, enablement acknowledgment information. The enablement acknowledgment information may indicate that the external thermal management system 114 and/or the one or more thermal management components 208 are enabled.

The controller 110 may receive the enablement acknowledgment information from the controller 212, and may thereby generate the second control information (e.g., described above). The second control information may indicate that the controller 212 is to control the external thermal management system 114 and/or the one or more thermal management components 208 of the external thermal management system 114, such as to facilitate thermal management of the battery system 104. The controller 110 may then send the second control information to the controller 212 to allow the external thermal management system 114 and/or the one or more thermal management components 208 to be controlled by the controller 212.

The controller 212 may receive the second control information from the controller 110, and may thereby control the external thermal management system 114 and/or the one or more thermal management components 208. For example, the controller 212 may cause a thermal transfer fluid to circulate between the external thermal management system 114 and the battery system 104 and/or the internal thermal management system 106 to facilitate thermal management of the of the battery system 104. The controller 212 may control (e.g., based on the second control information), for example, an amount of current that the one or more thermal management components 208 draw (e.g., via the power connector 210) to control how quickly the transfer fluid circulates.

Additionally, or alternatively, the controller 110, may generate the first control information (e.g., described above), regardless of whether the controller 110 generates and sends the second control information the controller 212. The first control information may indicate that the controller 206 of the internal thermal management system 106 is to control the internal thermal management system 106 and/or the one or more thermal management components 202 of the internal thermal management system 106, such as to facilitate thermal management of the battery system 104. The controller 110 may send the first control information to the controller 206 to allow the internal thermal management system 106 and/or the one or more thermal management components 202 to be controlled by the controller 206.

The controller 206 may receive the first control information from the controller 110, and may thereby control the internal thermal management system 106 and/or the one or more thermal management components 202. For example, the controller 206 may cause a thermal transfer fluid to circulate between the internal thermal management system 106 and the battery system 104 to facilitate thermal management of the of the battery system 104. The controller 206 may control (e.g., based on the first control information), for example, an amount of current that the one or more thermal management components 202 draw (e.g., via the power connector 204) to control how quickly the transfer fluid circulates.

As indicated above, FIG. 4 is provided as an example. Other examples may differ from what is described in connection with FIG. 4.

Figure 5:
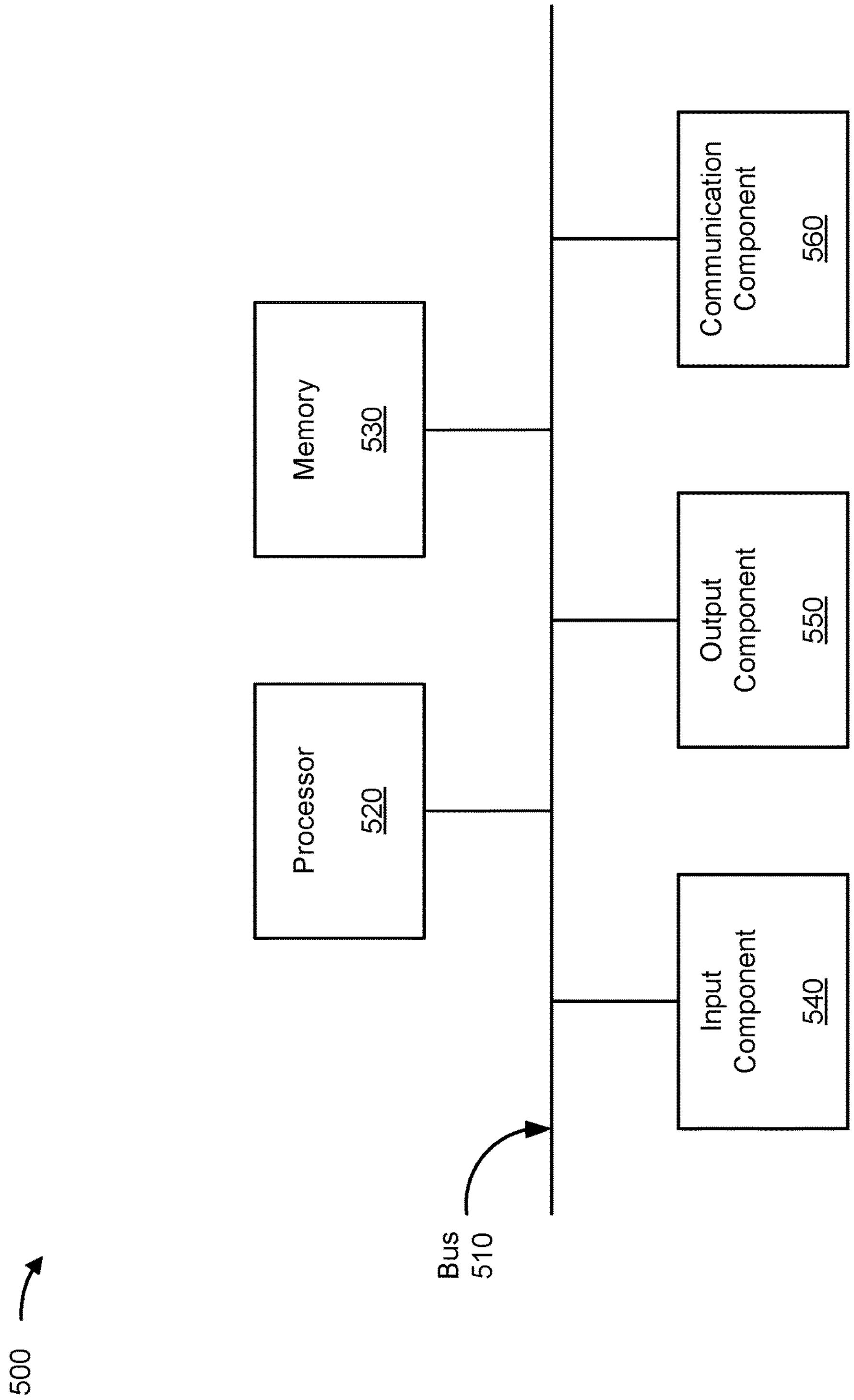
FIG. 5 is a diagram of example components of a device described herein.

FIG. 5 is a diagram of example components of a device 500 described herein. The device 500 may correspond to the controller 110 of the machine 102, the controller 206 of the internal thermal management system 106, and/or the controller 212 of the external thermal management system 114. In some implementations, the controller 110, the controller 206, and/or the controller 212 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
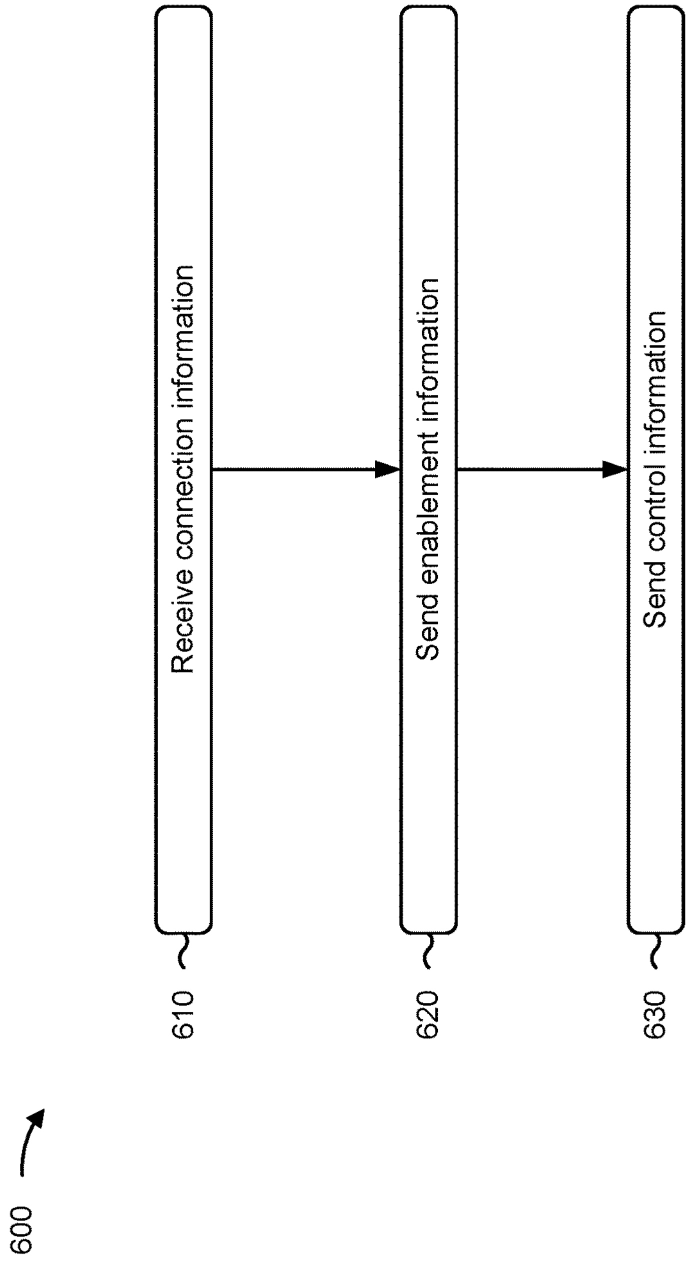
FIG. 6 is a flowchart of an example process related to facilitating thermal management of a battery system of a machine.

FIG. 6 is a flowchart of an example process 600 related to facilitating thermal management of a battery system of a machine. One or more process blocks of FIG. 6 may be performed by a controller (e.g., the controller 110). Additionally, or alternatively, one or more process blocks of FIG. 6 may be performed by another device or a group of devices separate from or including the controller, such as another device or component that is internal or external to the machine 102.

As shown in FIG. 6, process 600 may include receiving connection information (block 610). For example, the controller may receive, from another controller of a thermal management system that is separate from the machine, connection information. The connection information may indicate that the thermal management system is able to facilitate thermal management of a battery system of the machine, as described above.

As further shown in FIG. 6, process 600 may include sending enablement information (block 620). For example, the controller may send to the other controller, and based on receiving the connection information, enablement information. Sending the enablement information may allow one or more thermal management components of the thermal management system to be enabled by the other controller, as described above.

As further shown in FIG. 6, process 600 may include sending control information (block 630). For example, the controller may send to the other controller, and based on sending the enablement information, control information. Sending the control information may allow the one or more thermal management components to be controlled by the other controller, as described above. In some implementations, sending the control information allows the thermal management system to facilitate thermal management of the battery system of the machine in association with another thermal management system for the battery system of the machine that is included in the machine. In some implementations, sending the control information allows the thermal management system to facilitate thermal management of the battery system of the machine, independently of another thermal management system for the battery system of the machine that is included in the machine.

In some implementations, process 600 includes sending, by the controller, to an additional other controller of another thermal management system that is included in the machine, other control information to allow one or more other thermal management components of the other thermal management system to be controlled by the additional other controller.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

INDUSTRIAL APPLICABILITY

The disclosed external thermal management system (e.g., the external thermal management system 114) is a standalone thermal management system that may be used in association with any machine that includes a battery system to facilitate thermal management of the battery system. The external thermal management system includes one or more thermal management components that are configured to thermally connect to a battery system of a machine and/or an internal thermal management system for the battery system that is included in the machine. Further, the external thermal management system includes a controller (e.g., that is configured to communicate with a controller of the machine) to control the one or more thermal management components and thereby allow the external thermal management system to facilitate thermal management of the battery system. The external thermal management system is configured to facilitate thermal management of the battery system of the machine in association with the internal thermal management system, and, also independently of the internal thermal management system.

In this way, the external thermal management system is configured to ensure that the battery system stays within an optimal temperature range, even in extreme temperatures (e.g., in extremely hot or cold climates). For example, because the external thermal management system includes a power connector that is configured to provide power to the external thermal management system from an external power source (e.g., that is not included in the machine), the external thermal management system can facilitate thermal management of the battery system when the machine and/or the battery system are not operating. This prevents the battery system from being subject to too cold temperatures and being subject to too high temperatures, which decreases a likelihood that a capacity of the battery system is reduced and/or that the battery system degrades. Accordingly, the external thermal management system improves a performance and/or an operable life of the battery system, and of the machine that includes the battery system.

Further, the controller of the external thermal management system is configured to communicate with the controller of the machine. This ensures an optimal operation of the external thermal management system to facilitate thermal management of the battery system. For example, the controller of the machine can provide information related to a thermal management need and the controller of the external thermal management system can determine an optimal operating condition of the one or more thermal management components of the external thermal management system to meet the thermal management need. In this way, because the controller of the external thermal management system is configured to control the external thermal management system, the controller of the machine only needs to be configured to communicate information related to thermal management of the battery system, and does not need to be configured to control an off-machine system or components of an off-machine system.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first thermal management system for a battery system of a machine, comprising:

one or more thermal management components configured to facilitate thermal management of the battery system;

a power connector configured to provide power to the first thermal management system from a power source external to the machine; and a first controller configured to:

determine that at least one thermal management component, of the one or more thermal management components, is thermally connected to at least one of:

the battery system, or a second thermal management system for the battery system;

send, to a second controller of the machine and based on determining that the at least one thermal management component is thermally connected, connection information indicating that the first thermal management system is able to facilitate thermal management of the battery system; and send, to the second controller, enablement acknowledgment information indicating that the one or more thermal management components are enabled, wherein at least one of the first thermal management system is separate from the machine, or the second thermal management system is included in the machine.

2. The first thermal management system of claim 1, wherein the one or more thermal management components include at least one of:

one or more active thermal management components, or one or more passive thermal management components.

3. The first thermal management system of claim 1, wherein the at least one thermal management component is determined to be thermally connected to the battery system.

4. The first thermal management system of claim 1, wherein the one or more thermal management components are configured to facilitate thermal management of the battery system in association with the second thermal management system.

5. The first thermal management system of claim 1, wherein the one or more thermal management components are configured to facilitate thermal management of the battery system independently of the second thermal management system.

6. The first thermal management system of claim 1, wherein the power connector is configured to couple to an alternating current power source or a direct current power source that is not used to charge the battery system of the machine.

7. The first thermal management system of claim 1, wherein the at least one thermal management component is determined to be thermally connected to the second thermal management system.

8. The first thermal management system of claim 1, wherein the first controller is further configured to:

receive, from the second controller, enablement information; and cause, based on the enablement information, the one or more thermal management components to be enabled, wherein the enablement acknowledgment information is sent after causing the one or more thermal management components to be enabled.

9. The first thermal management system of claim 1, wherein the first controller is further configured to:

receive, from the second controller, control information; and control, based on the control information, the one or more thermal management components.

10. A first thermal management system for a battery system of a machine, comprising:

one or more thermal management components configured to facilitate thermal management of the battery system; and a first controller configured to:

send, to a second controller of the machine, enablement acknowledgment information indicating that the one or more thermal management components are enabled;

receive, from the second controller and after sending the enablement acknowledgment information, control information for controlling the one or more thermal management components; and control, based on the control information, the one or more thermal management components, wherein the first thermal management system is separate from the machine.

11. The first thermal management system of claim 10, wherein the one or more thermal management components are configured to facilitate at least one of:

an active thermal management of the battery system, or a passive thermal management of the battery system.

12. The first thermal management system of claim 10, wherein at least one thermal management component, of the one or more thermal management components, is configured to connect to a second thermal management system for the battery system, wherein the first thermal management system connecting to the second thermal management system allows a thermal transfer fluid to circulate between the first thermal management system and the second thermal management system, and wherein the second thermal management system is included in the machine.

13. The first thermal management system of claim 10, further comprising a power connector that is configured to provide power to the first thermal management system from a power source external to the machine.

14. The first thermal management system of claim 10, wherein the first controller is further configured to:

determine that the first thermal management system is thermally connected to at least one of the battery system or a second thermal management system for the battery system, wherein the second thermal management system is included in the machine; and send, to the second controller and based on determining that the first thermal management system is thermally connected to the at least one of the battery system or the second thermal management system, connection information.

15. The first thermal management system of claim 10, wherein the first controller is further configured to:

receive, from the second controller, enablement information; and cause, based on the enablement information, the one or more thermal management components to be enabled, wherein the enablement acknowledgment information is sent after causing the one or more thermal management components to be enabled.

16. A method, comprising:

receiving, by a first controller of a machine and from a second controller of a first thermal management system, connection information indicating that the first thermal management system is able to facilitate thermal management of a battery system of the machine, wherein the first thermal management system is separate from the machine;

sending, by the first controller, to the second controller, and based on receiving the connection information, enablement information to allow one or more first thermal management components of the first thermal management system to be enabled by the second controller; and sending, by the first controller, to the second controller, and based on sending the enablement information, first control information to allow the one or more first thermal management components to be controlled by the second controller.

17. The method of claim 16, further comprising:

sending, by the first controller and to a third controller of a second thermal management system, second control information to allow one or more second thermal management components of the second thermal management system to be controlled by the third controller, wherein the second thermal management system is included in the machine.

18. The method of claim 16, wherein sending the first control information allows the first thermal management system to facilitate thermal management of the battery system of the machine in association with a second thermal management system for the battery system, wherein the second thermal management system is included in the machine.

19. The method of claim 16, wherein sending the first control information allows the first thermal management system to facilitate thermal management of the battery system independently of a second thermal management system for the battery system, wherein the second thermal management system is included in the machine.

20. The method of claim 16, further comprising:

receiving, by the first controller, from the second controller and after sending the enablement information, enablement acknowledgment information indicating that the one or more first thermal management components are enabled, wherein the first control information is sent after receiving the enablement acknowledgment information.

* * * * *